US012059799B2

(12) United States Patent
Hohl

(10) Patent No.: US 12,059,799 B2
(45) Date of Patent: Aug. 13, 2024

(54) TOOL MANAGEMENT DEVICE WITH SLIDE GUIDE AND PIN AT HINGE CONNECTION

(71) Applicant: Würth International AG, Chur (CH)

(72) Inventor: Wolfgang Hohl, Amrichshausen (DE)

(73) Assignee: Würth International AG, Chur (CH)

(*) Notice: Subject to any disclaimer, the term of this patent is extended or adjusted under 35 U.S.C. 154(b) by 19 days.

(21) Appl. No.: 17/248,508

(22) Filed: Jan. 28, 2021

(65) Prior Publication Data

US 2021/0245360 A1 Aug. 12, 2021

(30) Foreign Application Priority Data

Feb. 10, 2020 (DE) ........................ 102020103322.2

(51) Int. Cl.
*B25H 3/02* (2006.01)
*B25H 3/00* (2006.01)

(52) U.S. Cl.
CPC ............ *B25H 3/003* (2013.01); *B25H 3/023* (2013.01)

(58) Field of Classification Search
CPC .......... B25H 3/00; B25H 3/003; B25H 3/006; B25H 3/02; B25H 3/04; B25H 3/06; B25H 3/021; B25H 3/023–028; B25B 13/56; B65D 25/108; B65D 25/10; E05B 17/0025; E05B 77/34; E05B 83/16; E05B 85/14; Y10T 292/0848; Y10T 292/086; Y10T 292/0911; Y10T 292/0948;
(Continued)

(56) References Cited

U.S. PATENT DOCUMENTS 1,858,539 A * 5/1932 Dewey .................. B25H 3/023 43/57.1
2,269,637 A * 1/1942 Bernard ................ B25H 3/003 206/379

(Continued)

FOREIGN PATENT DOCUMENTS

CN 101837584 A 9/2010
DE 2461766 A1 * 12/1974

(Continued)

OTHER PUBLICATIONS

D'andrea, A .; European Search Report in Application No. 20 21 7840; pp. 1-7; Jul. 5, 2021; European Patent Office, 80298, Munich, Germany.

(Continued)

*Primary Examiner* — J. Gregory Pickett
*Assistant Examiner* — Abigail Elizabeth Guidry
(74) *Attorney, Agent, or Firm* — Robert A. Blaha; Smith Tempel Blaha LLC

(57) ABSTRACT

A tool arrangement includes a tool management device with a body and a lid, wherein the lid, by a hinge connection, is configured pivotably for selectively covering or releasing a receiving space of the body relatively to the body, and a receiving device for receiving tool elements which is mounted or mountable in the receiving space of the body. By the hinge connection, the receiving device is co-pivoted when the lid is pivoted. The hinge connection includes at least one pin and the lid has at least one slide guide for guiding the at least one pin along a pregiven trajectory.

20 Claims, 7 Drawing Sheets

(58) Field of Classification Search
CPC ............. Y10T 292/0921; Y10T 292/11; Y10T 292/38; Y10T 292/63
See application file for complete search history.

(56) References Cited

U.S. PATENT DOCUMENTS

| | | | | | |
|---|---|---|---|---|---|
| 3,074,539 | A * | 1/1963 | Rogovin | B25H 3/003 206/379 |
| 3,612,635 | A * | 10/1971 | Uyeda | A01K 97/06 206/315.11 |
| 4,079,756 | A * | 3/1978 | Smiley | B65D 59/06 138/96 T |
| 4,091,918 | A * | 5/1978 | Soulakis | B42F 17/02 312/294 |
| 4,285,557 | A * | 8/1981 | Paladino | G11B 23/0236 220/519 |
| 4,512,467 | A * | 4/1985 | Knoblauch | B25H 3/003 312/902 |
| 4,655,342 | A * | 4/1987 | Brauner | G11B 33/0438 206/472 |
| 4,660,719 | A * | 4/1987 | Peterson | B25H 3/003 206/754 |
| 4,784,263 | A | 11/1988 | Stanley | |
| 5,562,208 | A * | 10/1996 | Hasler | B25F 1/00 206/373 |
| 5,746,316 | A * | 5/1998 | La Barre | B25H 3/003 206/443 |
| 5,813,533 | A * | 9/1998 | Knoblauch | B25H 3/003 206/748 |
| 5,875,948 | A * | 3/1999 | Sadler | E05B 77/00 70/159 |
| 5,957,285 | A * | 9/1999 | Lai | B65D 25/103 206/372 |
| 6,189,847 | B1 * | 2/2001 | Hart | B25H 3/04 248/220.31 |
| D444,299 | S * | 7/2001 | Budert | D3/905 |
| 6,283,291 | B1 | 9/2001 | Vasudeva et al. | |
| 6,547,077 | B1 * | 4/2003 | Budert | B25H 3/003 206/754 |
| 7,077,267 | B2 * | 7/2006 | Lee | B25H 3/023 206/372 |
| 7,537,117 | B2 * | 5/2009 | Roesler | B25H 3/003 206/443 |
| 7,677,391 | B2 | 3/2010 | Pistor et al. | |
| 7,780,037 | B2 * | 8/2010 | Corbellini | A45D 40/023 220/811 |
| 8,056,720 | B2 * | 11/2011 | Hawkes | A61B 50/31 206/439 |
| 8,106,295 | B1 * | 1/2012 | Shotey | H02G 3/14 174/67 |
| 8,196,742 | B1 | 6/2012 | Wang | |
| 8,250,993 | B2 * | 8/2012 | Griepentrog | G06F 1/1628 108/50.02 |
| 8,567,631 | B2 * | 10/2013 | Brunner | E05C 3/30 220/326 |
| 8,720,862 | B2 * | 5/2014 | Ernest | B65F 1/068 254/113 |
| 10,500,711 | B2 | 12/2019 | Steele et al. | |
| 2002/0014424 | A1 * | 2/2002 | Budert | B25H 3/003 206/378 |
| 2002/0190529 | A1 | 12/2002 | Breslin et al. | |
| 2003/0006627 | A1 * | 1/2003 | Votruba | E05B 77/34 296/182.1 |
| 2003/0221465 | A1 * | 12/2003 | Westwinkel | E05B 65/462 70/85 |
| 2006/0037880 | A1 * | 2/2006 | Wang | B25H 3/003 206/759 |
| 2006/0169613 | A1 * | 8/2006 | Roesler | B25H 3/003 206/379 |
| 2006/0169614 | A1 * | 8/2006 | Roesler | B25H 3/003 206/379 |
| 2006/0226042 | A1 * | 10/2006 | Seymour | B25H 3/003 206/743 |
| 2010/0032327 | A1 * | 2/2010 | Lai | B25H 3/003 206/375 |
| 2011/0315567 | A1 * | 12/2011 | Boynton | B65D 51/245 206/6.1 |
| 2013/0100608 | A1 * | 4/2013 | Guo | G06F 1/1679 361/679.58 |
| 2014/0054920 | A1 * | 2/2014 | Jeffries | E05C 19/06 292/202 |
| 2016/0144502 | A1 * | 5/2016 | Perkins | B25H 3/023 206/349 |
| 2018/0099548 | A1 * | 4/2018 | Held | B60J 7/106 |
| 2018/0222033 | A1 | 8/2018 | Livell | |
| 2019/0168376 | A1 * | 6/2019 | Brocket | B65D 21/02 |
| 2020/0157842 | A1 * | 5/2020 | Grela | E05C 3/008 |

FOREIGN PATENT DOCUMENTS

| | | | | |
|---|---|---|---|---|
| DE | 3511955 | A1 * | 4/1985 | B25H 3/00 |
| DE | 3837829 | C1 * | 11/1988 | |
| DE | 102005004253 | A1 | 8/2006 | |
| DE | 202015003561 | U1 * | 9/2015 | B25H 3/003 |
| DE | 202015106714 | U1 * | 2/2016 | B25H 3/02 |
| DE | 102015206606 | A1 * | 10/2016 | B25H 3/022 |
| DE | 102015206606 | A1 | 10/2016 | |
| DE | 202018100949 | U1 * | 7/2019 | |
| EP | 1 428 633 | A1 | 6/2004 | |
| EP | 1428633 | A1 | 6/2004 | |
| EP | 1428633 | A1 * | 6/2004 | B65D 85/20 |
| EP | 2570240 | A1 * | 3/2013 | B25H 1/04 |
| GB | 2164599 | A * | 3/1986 | B25H 1/12 |
| TW | M271679 | U | 8/2005 | |
| WO | WO-2011029192 | A1 * | 3/2011 | A47B 57/30 |

OTHER PUBLICATIONS

First Office Action in Application No. 110104587; pp. 1-19; Sep. 14, 2021; Taiwan Intellectual Property Office; 3F., No. 185, Sec. 2, Xinhai Rd., Da'an Dist., Taipei City 106213, Taiwan (R.O.C.).

English translation of First Office Action in Application No. 110104587; pp. 1-15; Sep. 14, 2021; Taiwan Intellectual Property Office; 3F., No. 185, Sec. 2, Xinhai Rd., Da'an Dist., Taipei City 106213, Taiwan (R.O.C.).

German Patent and Trademark Office; Search Report; pp. 1-6; May 2, 2022; Zweibrückenstraße 12, 80331, Munich, Germany.

Kendall, B.; Office Action in Application 3,108,217 in Canada; pp. 1-6, Jul. 17, 2022; Canadian Intellectual Property Office; 50 Victoria Street, Place du Portage 1, Gatineau, Quebec, K1A 0C9, Canada.

First Office Action in Application 202110181349.X; pp. 1-14; Dec. 1, 2023; China National Intellectual Property Administration; No. 6, Xitucheng Lu, Jimenqiao Haidian District, Beijing City, 1000088, China.

English Translation of First Office Action in Application 202110181349.X; pp. 1-7; Dec. 1, 2023; China National Intellectual Property Administration; No. 6, Xitucheng Lu, Jimenqiao Haidian District, Beijing City, 1000088, China.

* cited by examiner

TOOL MANAGEMENT DEVICE WITH SLIDE GUIDE AND PIN AT HINGE CONNECTION

CROSS-REFERENCE TO RELATED APPLICATION

The present application claims the benefit of the filing date of German Patent Application No. 10 2020 103 322.2, filed 10 Feb. 2020, the disclosure of which is hereby incorporated herein by reference.

TECHNICAL FIELD

Embodiments of the invention relate to a tool arrangement, a tool system and a method of managing tool elements by a tool arrangement.

TECHNOLOGICAL BACKGROUND

Drill boxes are known which are closable by a lid. When the lid is opened, a user may remove a drill from the drill box. Frequently, the drill boxes are stored in drawers. Usually, only one drill is removed from the drill box by a user for an application. For this purpose, the drawer has to be opened, the drill box has to be removed, the drill has to be selected and removed. After performing the application, the same steps have to be executed in reverse order to arrange the drill in the drill box again.

The elaborate handling of the drill boxes is disadvantageous.

SUMMARY

There may be a need to efficiently organize tool elements.

The subject matters with the features according to the independent patent claims are provided. Further embodiments are shown in the dependent claims.

According to an embodiment of the present invention, a tool arrangement with a tool management device with a body and a lid is provided, which, by a hinge connection, is configured pivotably relative to the body for selectively covering or releasing a receiving space of the body. The tool arrangement further comprises a receiving device for receiving tool elements which is mounted or mountable in the receiving space of the body such that, by the hinge connection, the receiving device is co-pivoted (mitgeschwenkt) when the lid is pivoted. The hinge connection may comprise at least one pin and the lid may comprise at least one slide guide for guiding the at least one pin along a pregiven trajectory and along a pregiven path, respectively.

According to a further embodiment of the present invention, a tool system is provided which comprises a container (in particular a case, a drawer, etc.) and a plurality of tool arrangements with the above-described features which are arranged in the container side by side and/or on top of each other.

According to a further embodiment of the present invention, a method of managing tool elements by a tool arrangement with the above-described features is provided, wherein the method comprises transferring the lid between an operating state which is covering the receiving space and an operating state which is releasing the receiving space, by guiding the at least one pin along the pregiven trajectory in the at least one slide guide.

OVERVIEW OF EMBODIMENTS

According to an embodiment of the present invention, a simply handable tool arrangement for pivotably receiving at least one receiving device for tool elements (such as drills) is provided, which is utilizable also under constricted space conditions with low effort. In particular, a tool arrangement is provided, wherein a lid of a tool management device is coupled to a hinge connection. Another end of the hinge connection is coupled to a receiving device for receiving tool elements which is mounted in a receiving space of the tool management device. In this way, by pivotably opening the lid using the hinge connection, the receiving device may be co-pivoted in a, for example upright, position. Thus, a user may, by one single hand movement, pivot the lid with respect to the body for making the receiving device accessible, wherein, by this opening motion, the receiving device may automatically move in a removing position of the tool elements. Advantageously, the hinge connection may comprise at least one pin and the lid may comprise at least one slide guide for guiding the at least one pin along a pregiven wayline. In this way, the tool management device which is configured with a pivotable lid and the receiving device for tool elements which is preferably also pivotably arranged in the tool management device, may be mechanically operatively coupled in an error-free robust manner. A pivoting motion of the lid relatively to the body may be realized in a precisely guided manner, wherein the receiving device may advantageously be co-moved during the pivoting motion. The latter is additionally promoted by the fact that the cooperation of the slide guide and the pin pregives a pivoting trajectory in a well-defined manner. Due to the hinge connection, the receiving device may co-pivot when pivoting the lid with respect to the body and may therefore expose the tool elements which are received therein for a user. A protective re-storing of the tool elements and the body is enabled by simply pivoting back the lid with respect to the body. The reciprocating motion of the pivoting may be definedly pregiven by the system made of a slide guide and pin. Thereby, both a maloperation may be avoided and a vulnerability of the tool management device for a damage may be effectively suppressed.

In the following, additional exemplary embodiments of the tool arrangement, the tool system and the method are described.

According to an exemplary embodiment, the hinge connection may comprise two pins at two opposing sides and the lid may comprise two slide guides at two opposing sides, each of which configured for guiding an assigned one of the two pins along a respective pregiven trajectory. By two such, preferably parallel, slide guides, a guiding is enabled which is especially precise, robust and error-free.

According to an exemplary embodiment, the pregiven trajectory may be pregiven by a (for example straight) guiding channel in the at least one slide guide. The pin may move along the guiding channel. Such a configuration is mechanically especially simple and compactly realizable and promotes a low-friction motion of the pin (or pins) in the guiding channel (or guiding channels). In particular, a length of the guiding channel and the slide guide, respectively, specifies a maximum opening angle and an opening angle range of the lid, respectively. Therefore, an arrangement of the slide guide in the lid is especially advantageous.

According to an exemplary embodiment, at least one guiding channel of the at least one slide guide may be configured, by guiding the at least one pin from a first end to an opposing second end of the at least one guiding channel, to allow a pivoting of the lid relative to the body by more than 90°, in particular more than 120°, further in particular by up to 180° or more. Thus, the slide guide in cooperation with the pin enables a very large pivoting angle between the lid and the body. In case of such a large pivoting angle, it is possible for a user in a simple manner to access the entire receiving space of the tool arrangement. In addition, by the slide guide with the elongated guiding channel, it may be enabled for a user to user-definedly adjust a folding angle within a wide range for the pin. For this purpose, it may be sufficient that a user displaces the pin to a desired position in the guiding channel, where the pin may be, for example frictionally, held.

According to an exemplary embodiment, at the at least one slide guide, at least one latching unit may be formed, at which the at least one pin is latchable, alternatively to guiding in the at least one slide guide. Providing a latching unit at the slide guide enables the hardware-technical adjustment of an alternative operating mode of the tool arrangement, in which a fixed folding angle is pregiven. In this case, the pin is rotating at a fixed position in the latching unit, when the lid is pivoted with respect to the body. In this embodiment, the folding angle may be defined by the fact, that the pin is latched at a corresponding position of the latching unit and may indeed rotate there, but cannot be translationally displaced.

According to an exemplary embodiment, when the at least one pin is latched in the at least one latching unit, a pivoting of the lid relative to the body may be allowed only by a smaller pivoting angle than when guiding the at least one pin in the at least one slide guide. In particular, the smaller pivoting angle may be smaller than 120°, in particular not larger than 90°. For example, when locking the pin in the latching unit, a pivoting angle of 90° may be enabled.

The different pivoting angles (for example 90° or approximately 180°) which correspond to the different configurations (pin in the latching unit and pin in the slide guide, respectively) enable a stable position of the lid depending on the number of receiving devices and a weight, respectively, of the tool elements in the one or in the multiple receiving devices.

For example, when relatively large and/or relatively heavy tool elements are received in the receiving device, when pivoting by a relatively small pivoting angle of 90°, for example (in particular by locking the pin in the latching unit), an undesirable pivoting back of the lid with the receiving device may occur. The cause for this may be a force and a torque, respectively, which may be generated by the tool elements. Descriptively, in this case the tool management device may undesirably fold to the closed state. For example, when such large and/or heavy tool elements are received in the receiving device, by pivoting by a relatively large pivoting angle of more than 90°, for example (in particular by guiding the pin in the slide guide), an undesirably lowering of the lid may be avoided.

According to an exemplary embodiment, the latching unit at its end may adjoin the at least one slide guide, namely preferably at an end side of the slide guide which is facing away from the receiving device. This enables a compact configuration of the tool arrangement and at the same time the freedom for a developer or a user to promote different pivoting properties with one and the same tool arrangement.

According to an exemplary embodiment, a receiving opening of the latching unit for receiving the at least one pin may be substantially C-shaped. Descriptively, the pin may be inserted in the open end of the C-shaped receiving opening of the latching unit and may be latched there at a fixed position, but in a pivotable manner. This enables intuitive handling of the tool arrangement and realizing the latching unit with low effort.

According to an exemplary embodiment, the hinge connection may comprise a stirrup which connects the lid with the receiving device, which in particular is configured as a substantially C-shaped stirrup. Such a stirrup may be a bent plate body, for example, which may be manufactured in a compact and simple manner. It may be (preferably rotatably) coupled at both lateral ends with the receiving device. A central portion of the stirrup which is arranged in between may laterally comprise two opposing pins which cooperate with slide guides at the lid of the tool arrangement.

According to an exemplary embodiment, the hinge connection (in particular a stirrup of the hinge connection) may be configured so rigidly at a factory, that the at least one pin of the hinge connection is pre-mounted to the slide guide or at at least one latching unit at the slide guide in a manner which is not changeable by a user. At the factory, the tool arrangement may either be configured such that a fixed folding angle is enabled (in particular by inserting the respective pin in a latching unit), or such that a folding angle over a larger range may be adjusted as desired (in particular by displacing the respective pin along a guiding channel of the hinge connection). After performing this adjustment at the factory, due to the high rigidity of the stirrup, a change of the configuration is no longer possible. Thereby, for example a maloperation by a user may be avoided.

According to another exemplary embodiment, the hinge connection (in particular a stirrup of the hinge connection) may be deformable such that the at least one pin of the hinge connection is changeably re-mountable by a user between the slide guide and the at least one latching unit at the slide guide. A first mounting position may correspond to a fixed folding angle between the lid and the body, which may be enabled by firmly latching a respective pin in a latching unit of the lid, for example. In a second mounting position of the hinge connection, the pin may be displaceably mounted in a guiding channel of a slide guide. By forming the material of the hinge connection softly and elastically, respectively, it may be possible for a user to freely select between the configuration with fixed folding angle and the configuration with variable folding angle by bending and temporarily deforming, respectively, the hinge connection and its stirrup, respectively.

According to an exemplary embodiment, the lid may comprise an outer receiving structure for receivably engaging complementary receiving structures at a bottom side of the body of a similar or identical tool arrangement, such that the tool arrangement and the same or similar tool arrangement are stackable. In a corresponding manner, the body may comprise receiving structures at its bottom side for form-lockingly inserting into an outer receiving structure of the lid of a similar or identical tool arrangement, such that the tool arrangement and the similar or identical tool arrangement are stackable. "Similar tool arrangement" may denote such a one whose structure (in particular with respect to the receiving structures of the body and the receiving structure of the lid) corresponds to that of the tool arrangement, but which may have different dimensions and/or another shape than that of the tool arrangement. In this way, a modular system of stackable tool arrangements may be provided which may be arranged in a non-slip and space-saving manner.

According to an exemplary embodiment, the body may comprise a suspension unit at its outer side, in particular a suspension groove, for suspending in a rail. Also, this measure increases the modularity of the system, since tool arrangements may be suspended with a handle at a shelf rail, for example, in a storage room or at a construction side, for example.

According to an exemplary embodiment, the lid may comprise a drain for water which (for example in the case of rainwater) is acting upon a top side of the lid. "Water drain" may in particular denote a mechanical configuration which enables the draining of water along a predefined path. Thereby, a water retention at the tool arrangement and a water flow to undesired locations of the tool arrangement, respectively, may be reliably prevented. The susceptibility for rust of the tool elements which are stored in the tool arrangement may therefore be reduced, for example.

According to an exemplary embodiment, the drain may comprise at least two channels at a side of an edge which are fluidically connected to each other, in particular in the region of an actuation unit of a locking mechanism at the lid. Such channels may be arranged angularly, for example orthogonally, and may be fluidically connected to each other. By a system of fluidically communicating channels, a defined path for draining a liquid is provided, which in particular may be guided around an actuation unit of a locking mechanism and may thus not functionally impair it. Thus, such a liquid may be prevented from undesirably entering the body.

According to an exemplary embodiment, the lid may be configured detachably from the hinge connection and from the body, respectively. Thereby, it is possible to use the tool arrangement also without a lid and to insert it under constricted conditions (for example in a drawer or in a case interior), for example, where a use of the tool arrangement with the lid would make it difficult or impossible to entirely pivot the lid upwards for making the tool elements accessible. Pivoting the receiving device in a removing position or equipping position may be performed by a user actuating either directly the hinge connection or the receiving device. In this way, with a low constructional effort, a simple and intuitive handable tool arrangement may be provided which may be selectively used with or without the lid.

According to an exemplary embodiment, the receiving device may be mounted or mountable in the receiving space such that, by the hinge connection, the receiving device is pivoted out of the receiving space when pivoting the lid for releasing the receiving space, in particular pivoted in an upright position. Advantageously, by a single hand movement, the lid may be pivoted away from the body and at the same time also the receiving device is pivoted out of the receiving space. Thus, it is sufficient for a user to perform a single hand movement, to get access to tool elements and to tool element mounts or recesses of the receiving device, respectively.

According to an exemplary embodiment, the receiving device may be mounted or mountable in the receiving space such that, by the hinge connection, the receiving device is pivoted into the receiving space, in particular pivoted in a lying position, when pivoting the lid for covering the receiving space. By merely closing the lid, without the need for a user to take any further measure, the receiving device which was previously located in a position which is accessible for a user, is pivoted back in the receiving space again. Thereby, a simple handable tool arrangement is provided, in which the receiving space may be efficiently used.

According to an exemplary embodiment, the receiving device may be mounted or mountable in the receiving space such that, when the lid is detached, the receiving device is pivotable from a lying position in a force-free state by the hinge connection by muscle strength of a user in an upright position. Advantageously, the receiving device may automatically pivot back in the lying state when the muscle strength is discontinued. In such a configuration, when the lid of the tool arrangement is detached, a user has to bring the receiving device which is lying without exerting the muscle strength in an upright position, to insert tool elements into the receiving device or to remove tool elements from the receiving device. By merely releasing (Loslassen), the receiving device may automatically pivot back into the receiving space. This enables an actuation of the tool arrangement with one hand and in a simple manner.

According to an exemplary embodiment, the hinge connection may be configured to be pivotably and detachably attached to the lid by a detachable connection mechanism at a hinge connection mount at an inner side of the lid. For example, it is possible to accomplish a coupling between the hinge connection and the lid by clicking in or forming a latching connection at the lid. Therefore, it is possible for a user in a simple manner to selectively connect the hinge connection with the lid or to remove the hinge connection from the lid.

The hinge connection may comprise a permanent or also a detachable connection to the receiving device. In case of a detachable connection, also at the side of the receiving device, it is possible for a user in a simple manner to selectively equip a tool management device with different receiving devices which nevertheless may be pivotable by merely handling a lid.

According to an exemplary embodiment, the hinge connection may be configured, by a connection mechanism at at least one hinge connection mount at at least one sidewall of the receiving device, in particular at two opposing hinge connection mounts at two opposing sidewalls of the receiving device, to be pivotably and detachably attached to the lid.

Descriptively, the hinge connection may laterally engage a receiving device in the receiving space and may thus exert a pivoting force upon the receiving device at two positions. The two-sided or both-sided engaging of the receiving device may be advantageous for exerting symmetrical pivoting forces, which suppress or even completely exclude a catching (Verhaken) or a failure.

According to an exemplary embodiment, the hinge connection may be configured to remain attached to the receiving device when being removed from the lid. In this way, a user may pivot a receiving device by grasping at the, for example stirrup-shaped, hinge connection, even when the lid of the tool arrangement is detached.

According to an exemplary embodiment, the hinge connection may be configured as a stirrup, in particular as a substantially C-shaped stirrup. A stirrup-like configuration of the hinge connection serves for a symmetrical and well-defined force transmission without the risk of undesired excessive mounting forces. In addition, a stirrup-shaped hinge connection promotes a grasping of the hinge connection by a user in an anatomically advantageous configuration.

According to an exemplary embodiment, two opposing legs of the hinge connection, which is configured as a stirrup, may engage respective outward facing surfaces of an adjacent receiving device near the two opposing sidewalls of the receiving device. A connection portion of the hinge connection may engage sidewalls of the lid. This enables the handling of the tool arrangement with a low actuation force and additionally leads to low mounting forces. Furthermore, a hinge connection which is realized with two legs and a connection portion may be simply manufactured and operates during use in a robust error-free manner.

According to an exemplary embodiment, the tool arrangement may comprise a locking mechanism which is attached partially to the lid and partially to the body, which is configured for locking at the body, when the receiving space of the body is covered by the lid. By the possibility to lock the tool arrangement from an outer side of the lid, it is possible to avoid an undesirably falling of tool elements out of the tool arrangement, also in mobile applications (for example in a vehicle or during a transport of the tool arrangement by hand).

According to an exemplary embodiment, the locking mechanism may comprise an actuation unit for actuating the locking mechanism by a user at an outer surface of the lid. Preferably, the actuation unit may be formed at a top side of the lid. By a such configured actuation unit, a user may actuate the locking mechanism also without a tool. When the actuation unit is arranged at the top side of the lid, the lid of a tool arrangement may be conveniently opened, even when a multiplicity of tool arrangements is stored side by side (for example in a case). In other words, by the implementation of the actuation unit at the top side, a single tool arrangement of a group or tool system may be individually actuated. This improves the usability of tool arrangements, in particular under constricted space conditions.

According to an exemplary embodiment, the locking mechanism may comprise a shaft which is mounted at the lid with at least one latching hook (preferably with two latching hooks which may be attached at two opposing ends of the shaft), which is configured for rotationally engaging in a latching mount (for example a latching nose or member) at the body. Such a configuration enables a simple manufacture of the locking mechanism and an intuitive, error-free and robust actuation.

According to an exemplary embodiment, the shaft may directly abut against an inner wall of the lid. In particular, the shaft may advantageously be in physical contact with the inner wall of the lid. In this way, it may be avoided that the tool elements (for example small bits or screws) get jammed between the shaft and the lid and may block a locking mechanism of the tool arrangement.

According to an exemplary embodiment, the shaft may be embedded in an inner wall of the lid, in particular adjoining a slant. Such slants and undercuts, respectively, extending from the shaft, may especially reliably prevent small parts or other items from slipping behind the shaft and thus blocking the locking mechanism.

According to an exemplary embodiment, the tool arrangement may comprise a further hinge connection at a pivoting axis between the body and the lid, which is configured for pivoting the lid relative to the body. The further hinge connection may be detachable from the body, as illustrated in FIG. 6, for example. By a further hinge connection between the lid and the body, the force transmission during a pivoting motion may be achieved in a more error-free and robust manner. Descriptively, the hinge connection between the lid and the receiving device and the further hinge connection between the lid and the body cooperate for forming well-defined pivoting motions without excessive mounting forces. The hinge connection and the further hinge connection may comprise pivoting axes which are in parallel with respect to each other.

According to an exemplary embodiment, the receiving device may comprise a block-shaped, in particular an ingot-shaped, base body, at least one tool element recess which is formed at the base body for user-definedly receiving at least one tool element, and coupling structures which are formed at the base body for coupling the receiving device with the tool management device.

Such a block-shaped, in particular ingot-shaped, receiving device may be simply manufactured (for example by injection molding) and enables in a compact configuration the reception of multiple tool elements. Coupling structures at the sides of such a block or ingot may be configured for mounting at another receiving device or at the body. These coupling structures may be configured for pivotably mounting or for rigidly mounting the receiving device.

According to an exemplary embodiment, the coupling structures may be arranged at two opposing side surfaces of the base body. The symmetrical arrangement of the coupling structures at opposing side surfaces of the receiving device serves for a symmetrical force transmission.

According to an exemplary embodiment, the coupling structures may be selectively configured for coupling the block with the tool management device and for decoupling the block from the tool management device. Thus, a receiving device may be detachably attached to the body and may thus be replaced in a simple manner. In this way, a modular system is provided which may be configured in a manner tailored to individual demands by a user who wants to arrange tool elements in a certain order.

According to an exemplary embodiment, a serial arrangement of multiple tool element mounts may be formed at the base body. For example, at least two, in particular at least four, further in particular at least eight, tool elements may be provided in a linear arrangement to accommodate multiple tool elements in a block in a space-saving manner. A serial arrangement of multiple tool elements (for example bits or drills) across one or more blocks serves for a compact accommodation of the various tool elements in the tool arrangement.

According to an exemplary embodiment, the at least one tool element recess may be configured for receiving at least one drill, in particular may comprise a circular inner profile. A drill may be configured for a use in a drilling machine as a tool, by which holes may be generated in a rigid material by a rotating motion. Frequently, a drill has a cylindrical receiving body which may be inserted into a correspondingly shaped and dimensioned tool element recess. Alternatively or additionally to drills, in cylindrical tool element recesses, also other tool elements with cylindrical receiving body may be received, for example milling cutters. In this way, drills, milling cutters or other tool elements with cylindrical shaft may be accommodated in the receiving device.

According to an exemplary embodiment, the at least one tool element recess may be configured for receiving at least one bit, in particular may comprise a hexagonal inner profile. "Bit" in particular may denote a replaceable screwdriver blade without a handle for a certain screw head profile. A receiving body of a bit for inserting into the tool element recess of the block may be hexagonal, for example. The receiving body may be inserted into a correspondingly standardized bit holder.

According to an exemplary embodiment, the block may be configured integrally, in particular made of one material, in particular as an injection molded article. In this way, a simple and rapid manufacture of the block with a lightweight configuration is possible.

According to an exemplary embodiment, the tool arrangement may comprise at least one further receiving device for receiving tool elements which is mounted or mountable in the receiving space of the body at the receiving device, in particular by angle pieces at opposing sides of the receiving device. In particular, the at least one further receiving device may be, in particular exclusively, mounted at a side of the receiving device which is facing away from the lid, in particular in a hinge-free manner. In this way, it is possible to couple only one single receiving device with the hinge connection and to couple one or more further receiving devices to the receiving device which is pivotably mounted at the lid and the body, respectively, for example. The coupling between different receiving devices may be performed in a rigid and pivoting-free manner, respectively. This leads to a mechanically simple configuration of the tool arrangement which nevertheless allows a free configuration and equipping of the tool management device by a user with one or more receiving devices which are freely combinable with each other. When pivoting the receiving device which is pivotably mounted at the hinge connection and the body, respectively, the further receiving devices which are rigidly coupled to it, also pivot into the receiving space of the body and may thus be accommodated in a space-saving manner. In summary, this leads to a compact and mechanically simple configuration of the tool arrangement.

According to an exemplary embodiment, the at least one further receiving device may comprise a block-shaped, in particular ingot-shaped, base body, at least one tool element recess which is formed at the base body for user-definedly receiving at least one tool element, and coupling structures which are formed at the base body for coupling the at least one further receiving device with the above-described receiving device. In other words, also the one or more further receiving devices may be configured in a block-shaped or ingot-shaped manner, as described above. It is possible that the receiving device on the one hand and the other receiving device on the other hand receive different tool element types (for example the receiving device drills and the further receiving device bits).

According to an exemplary embodiment, the body may comprise a bottom and four sidewalls. For example, the four sidewalls may extend substantially vertically from a substantially planar bottom, to delimit a large receiving space in which the receiving devices and the tool elements are arranged, stored, protected, and prevented from falling out.

According to an exemplary embodiment, the tool management device may be configured to be form-lockingly stackable with a similar or identical tool management device. "Identical tool management device" denotes such a one which is identical to said tool management device with respect to shape and dimension. "Similar tool management device" denotes such a one whose shape or design corresponds to or complements that of said tool management device, which nevertheless may comprise other dimensions at least in portions, for example. Structures for stacking tool management devices, in case of similar tool management devices, may be advantageously configured in such a manner that they are correspondingly usable with each other.

According to an exemplary embodiment, for stacking, a bottom or base of the body may comprise outer (preferably rectangular) feet for engaging in and/or around corresponding profiles (preferably rectangular indentations) at an outer side of the lid. A form-locking connection of feet at a bottom surface of the base with corresponding indentations or any other profile at a top side of the lid enables simple and intuitive stacking of the tool arrangement without the risk of sliding or releasing. For example, this may be advantageous for mobile applications, such as in a vehicle.

Alternatively or preferably additionally, for stacking, the tool arrangement may comprise at a bottom of the body at an inner side an at least partially surrounding bar for engaging in an at least partially surrounding indentation in an inner region of the lid. In this way, also in an inner region of the body and the lid, a stackable system of corresponding structures may be formed. In particular, this enables stacking of similar, but not identical tool arrangements, for example tool arrangements with different sizes. These may nevertheless comprise corresponding stacking structures in an inner region of the body and the lid for stacking.

According to an exemplary embodiment, the method may comprise, after detaching the lid, accommodating the body and the receiving device which is mounted to it under constricted space conditions, in particular in a drawer or in a case. "Constricted space conditions" in particular denotes space conditions in which a pivoting of the lid of the tool arrangement is excluded to such an extent as it is necessary for an unobstructed access for a user to the tool elements which are located in the at least one receiving device. In particular, the method may comprise, after accommodating the tool arrangement without the lid, pivoting the receiving device and removing a tool element from the receiving device without removing the body and the receiving device which is mounted to it from the drawer or from the case or any other constricted space conditions. When the lid is separated from the body and the receiving device, the tool arrangement without the lid may be actuated under constricted space conditions, such as in a case or in a drawer, without the need to completely remove the tool arrangement from the drawer or the like before pivoting out the receiving device. Instead, the tool arrangement without the lid may remain in the drawer or in any other constricted environment, so that a user may directly accomplish pivoting out the receiving device by hand there, to get access to the tool elements and the tool element recesses of the receiving device, respectively. A management and a use also of a complex set of tool elements is possible for a user in a simple and rapid manner.

In particular, the method may comprise user-definedly receiving at least one tool element at at least one tool element recess which is formed at the receiving device, and coupling the receiving device with the tool management device by forming an operative connection between the coupling structures which are formed at the receiving device and the further coupling structures of the tool management device. According to an exemplary embodiment, the method may comprise equipping and/or re-equipping the receiving device by a user with a set of user-defined tool elements which is selected from a larger reservoir of tool elements by a user. According to such embodiments of the invention, a freely combinable modular system is provided. In other words, the hinge connection (for example by the stirrup-shaped configuration) may be formed such that a user may anatomically simply grasp it, to be able to pivot the receiving device out of the receiving space of the body in a simple manner, also when the lid is demounted. Descriptively, a user may equip a desired receiving device of a set of receiving devices with a desired arrangement of a larger set of tool elements and may flexibly equip the receiving space of the receiving arrangement with it. Thereby, a flexibly configurable system is provided which may be tailored by a user to his individual demands.

According to an exemplary embodiment, the method may comprise equipping and/or re-equipping the tool management device by a user with a set of user-defined receiving devices which is selected from a larger reservoir of receiving devices by a user. Also, multiple types of receiving devices (for example a drill box, a bit box or a bit holder box) may form a part of an assembly set which may be variably combined by a user to adapt it to a respectively desired set of tool elements.

In the following, exemplary embodiments of the present invention are described in detail with reference to the following figures.

DETAILED DESCRIPTION OF ILLUSTRATED EMBODIMENTS

Same or similar components in different figures are provided with the same reference numbers.

Figure 5:
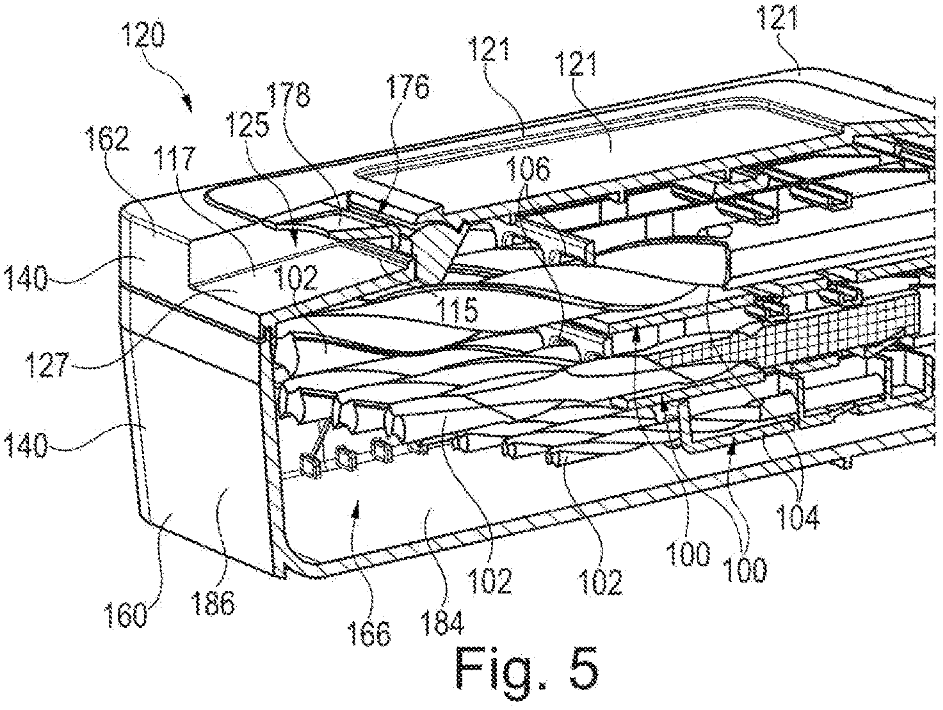
FIG. 5 shows a cross-sectional view of the tool arrangement according to FIG. 1 to FIG. 4 when the lid is closed.
Figure 6:
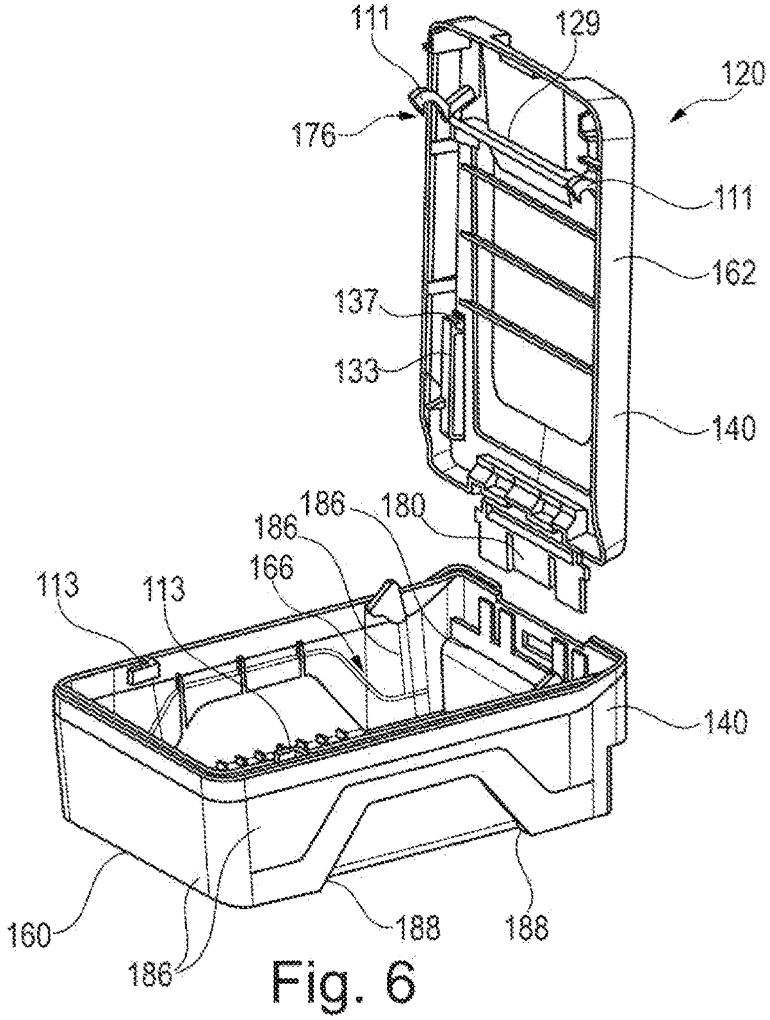
FIG. 6 shows a three-dimensional view of the tool arrangement according to FIG. 1 to FIG. 5 when the lid is detached.

FIG. 1 to FIG. 4 show three-dimensional views of a tool arrangement 120 according to an exemplary embodiment of the invention when the lid 162 is opened. FIG. 1A shows a detail of the tool arrangement 120 according to FIG. 1 to FIG. 4 in a first mounting position with pins 131 in a respective guiding channel 135 of a respective slide guide 133 which is cooperating with it. FIG. 1B shows another detail of the tool arrangement 120 according to FIG. 1 to FIG. 4 with components of a locking mechanism 176. FIG. 1C shows a further detail of the tool arrangement 120 according to FIG. 1 to FIG. 4 in a second mounting position which is different from the first mounting position. In the second mounting position the pins 131 are latched in assigned latching units 137 at the slide guides 133. FIG. 5 shows a cross-sectional view of the tool arrangement 120 according to FIG. 1 to FIG. 4 when the lid 162 is closed. FIG. 6 shows a three-dimensional view of the tool arrangement 120 according to FIG. 1 to FIG. 5 when the lid 162 is detached.

According to FIG. 1 to FIG. 4, the lid 162 is pivoted up with respect to a body 160 under release of a receiving space 166.

The tool arrangement 120 comprises a tool management device 140 which is configured as a box with a body 160 and a lid 162. The lid 162, by a hinge connection 164, is configured pivotably relatively to the body 160 for selectively covering or releasing the receiving space 166 of the body 160.

Furthermore, the tool arrangement 120 comprises a receiving device 100 which is here configured as a drill box for receiving tool elements 102, which is detachably mounted in the receiving space 166 of the body 160. The tool elements 102 may be received at the receiving device 100 by being inserted by a user in corresponding receiving hollows as tool element recesses 106. The receiving device 100 is mounted or mountable in the receiving space 166 of the body 160 so that, by the hinge connection 164, the receiving device 100 is co-pivoted when the lid 162 is pivoted.

Advantageously, the lid 162 may be configured detachably from the body and the hinge connection 164, as can best be seen in FIG. 6. Thereby, it is possible that after detaching the lid 162 from the rest of the tool arrangement 120 and after releasing the connection between the lid 162 and the hinge connection 164, the receiving device 100 is pivotable with respect to the body 160 without the lid 162 by actuating the hinge connection 164.

Furthermore, when the lid 162 is coupled to the body 160 and to the hinge connection 164, the receiving device 100 may be mounted or mountable in the receiving space 166 which is delimited by the body, such that, by the hinge connection 164, the receiving device 100 is pivoted out of the receiving space 166 when the lid 162 is pivoted for releasing the receiving space 166. In this case, the receiving device 100 may advantageously be pivoted in an upright position. Furthermore, the receiving device 100 may be mounted or mountable in the receiving space 166 such that, by the hinge connection 164, the receiving device 100 is pivoted into the receiving space 166 when the lid 162 is pivoted for covering the receiving space 166. Thereby, the receiving device 100 may be pivoted in a lying position in which the receiving device 100 is accommodated in the receiving space 166 in a space-saving manner.

Moreover, the receiving device 100 may be mounted in the receiving space 166 such that, when the lid 162 is detached, the receiving device 100 is pivotable from a lying position in a force-free state by the hinge connection 164 by the muscle strength of a user. Such a pivoting may result in the receiving device arriving in an upright position. For example, when the receiving device and its contents are not balanced, the receiving device 100 may automatically pivot back to the lying state when the muscle strength of a user is discontinued.

Advantageously, the hinge connection 164 may be configured to be pivotably and detachably attached to the lid 162 by a detachable connection mechanism at a hinge connection recess at sidewalls of the lid 162. Furthermore, the hinge connection 164 may be configured to be pivotably and detachably attached to the lid 162 by a connection mechanism at two opposing hinge connection legs or tabs 168 at two opposing sidewalls of the receiving device 100. Moreover, the hinge connection 164 may be configured to remain attached to the receiving device 100 when the lid 162 is detached.

Figure 1:
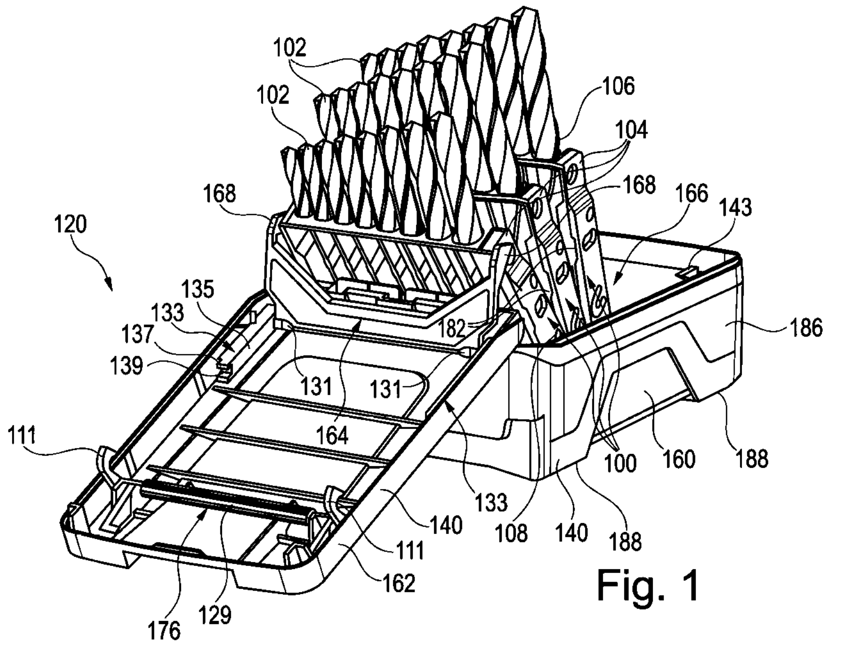
FIG. 1, FIG. 2, FIG. 3 and FIG. 4 show three-dimensional views of a tool arrangement according to an exemplary embodiment of the invention when the lid is opened.
Figure 1A:
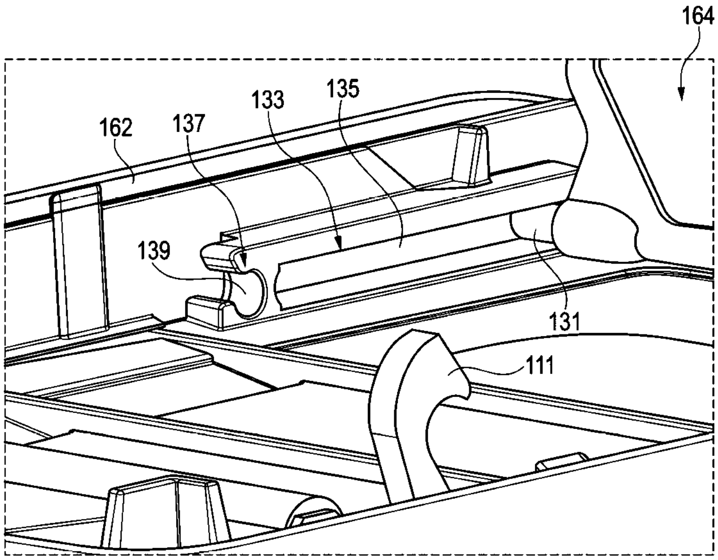
FIG. 1A shows a detail of the tool arrangement according to FIG. 1 to FIG. 4 with a pin in a guiding channel of a slide guide which is cooperating with it.
Figure 1B:
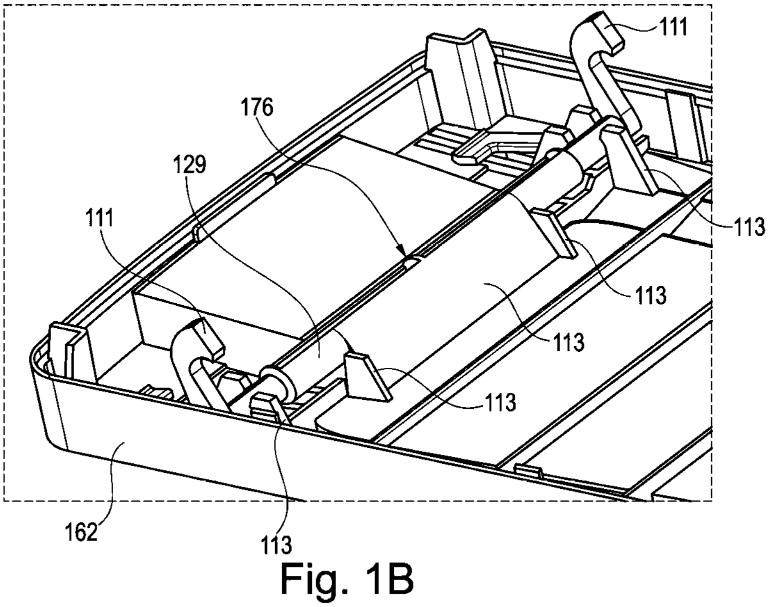
FIG. 1B shows another detail of the tool arrangement according to FIG. 1 to FIG. 4 with components of a locking mechanism.
Figure 1C:
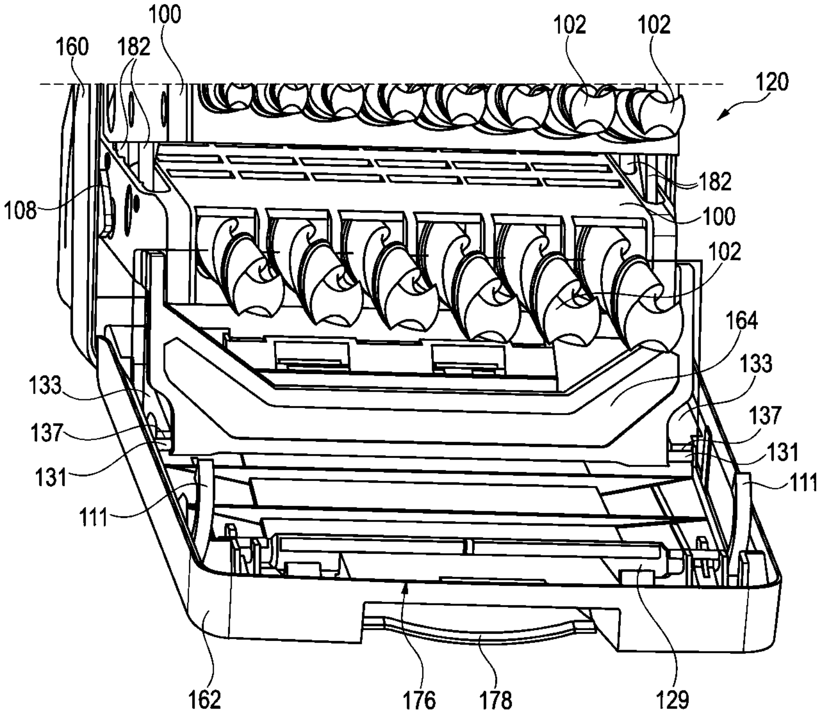
FIG. 1C shows a further detail of the tool arrangement according to FIG. 1 to FIG. 4 with a pin in a latching unit at a slide guide.
Figure 3:
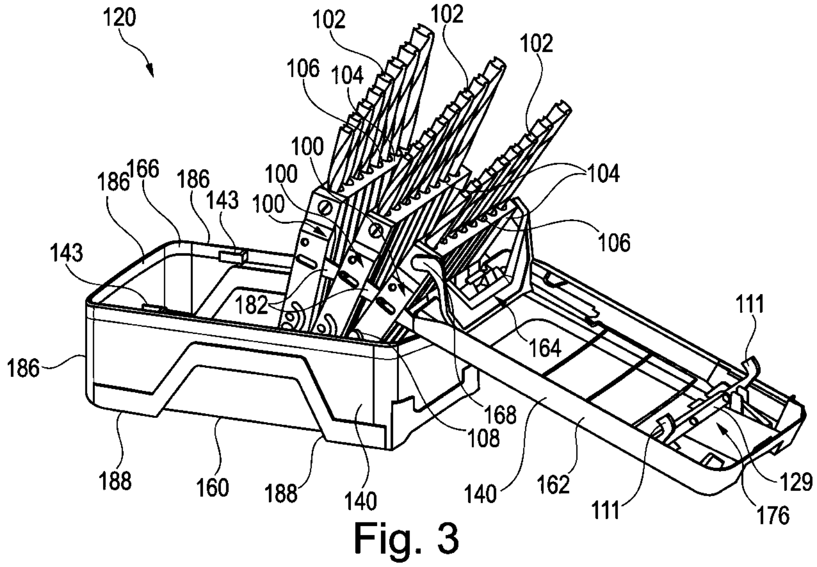
Figure 4:
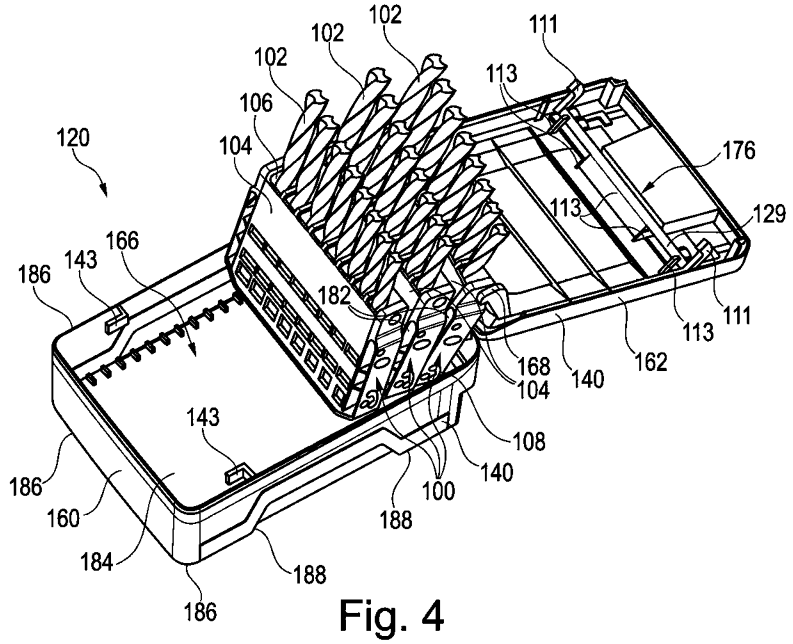

As illustrated in FIG. 1, the hinge connection 164 may be configured as a substantially C-shaped stirrup. Two opposing legs of the hinge connection 164 which is configured as stirrup engage at the two opposing sidewalls of the receiving device 100 at an outer side.

Furthermore, partially at the lid 162 and partially at the body 160, a locking mechanism 176 is attached. The locking mechanism 176 serves for locking the lid 162 at the body 160, when the receiving space 166 of the body 160 is covered by the lid 162. For this purpose, the locking mechanism 176 comprises an actuation unit 178 for actuating the locking mechanism 176 by a user at an outer surface of the lid 162. By actuating the actuation unit 178, a respective pivoting bolt or shaft 129 and latching hook 111, respectively, may be lockingly inserted into a bolt receiver which may be configured as mounting tabs or slants 113.

Moreover, the tool arrangement 120 comprises a further hinge connection 180 at a pivoting axis between the body 160 and the lid 162 (see FIG. 6). The further hinge connection 180 is configured for promoting the pivoting of the lid 162 relatively to the body 160.

In the following, the receiving device 100 which is connected with the hinge connection 164 is described in more detail. In the shown embodiment, this receiving device 100 comprises a block-shaped base body 104 which may have approximately the shape and the size of a cigarette packet, for example. At the base body 104, serially arranged tool element recesses 106 for user-definedly receiving tool elements 102 are provided, in the illustrated example drills. A respective tool element recess 106 may be configured for receiving at least one drill and may comprise a circular inner profile for this purpose. Each of the tool element recesses 106 may be equipped with a drill as tool element 102.

Moreover, at the base body 104, coupling structures (see reference sign 108 in FIG. 1) for coupling the receiving device 100 with the tool management device 140 are formed. Said coupling structures 108 are arranged at two opposing side surfaces of the base body 104. The coupling structures 108 selectively serve for coupling the receiving device 100 which is configured as a block with the tool management device 140 and for decoupling the receiving device 100 from the tool management device 140. Advantageously, the receiving device 100 may be configured integrally and made of one material, especially preferred as an injection molded article.

As shown, at the tool arrangement 120, one or more further receiving devices 100 for receiving tool elements 102 may be provided. These may be mounted or mountable in the receiving space 166 of the body 160 at the receiving device 100. This mounting may advantageously be accomplished by angle pieces 182 at opposing sides of the respective one of the receiving devices 100 (FIG. 1C).

The further receiving devices 100 may be mounted exclusively at a side of the pivotably mounted receiving device 100 which is facing away from the lid 162, for example. Besides, the further receiving devices 100 may be coupled to the only pivotably mounted receiving device 100 in a hinge-free and rigid manner.

The body 160 of the tool management device 140 may comprise a bottom 184 and four sidewalls 186 which are integrally connected with the bottom 184, to thereby delimit the receiving space 166.

As can best be recognized in FIG. 1, FIG. 1A and FIG. 1C, the hinge connection 164 may comprise a pair of opposing pins 131. Correspondingly to this, the lid 162 may comprise a pair of opposing slide guides 133 at two opposing side walls. Each of the slide guides 133 is configured for guiding the respectively assigned pin 131 along a pregiven trajectory. In other words, the hinge connection 164 comprises the two pins 131 at two opposing sides and the lid 162 comprises the two slide guides 133 at two opposing sides. Thus, each of the slide guides 133 is utilized for guiding an assigned one of the two pins 131 along a respectively pregiven trajectory. This trajectory is defined by the geometry of the respective slide guide 133. In more detail, the respective trajectory is pregiven by a straight guiding channel 135 in the assigned slide guide 133. As can best be seen in FIG. 1A, a guiding channel 135 of the respective slide guide 133 is configured to allow a pivoting of the lid 162 relatively to the body 160 around a certain angle by mechanically guiding the respectively assigned pin 131 from a first end to an opposing second end of the mentioned guiding channel 135. Depending on how far the pins 131 are displaced in the guiding channels 135, the opening angle between the lid 162 and the body 160 is larger or smaller. In the mounting position which is illustrated in FIG. 1 and FIG. 1A, the opening angle is approximately 180°, when the pins 131 are displaced up to a stopper at the end of the respectively assigned guiding channel 135 of the respective slide guide 133.

As can also best be seen in FIG. 1, FIG. 1A and FIG. 1C, at each of the slide guides 133, a respective latching unit 137 is formed, at which the respectively assigned pin 131—alternatively to guiding in a guiding channel 135—is latchable. When the pins 131 are latched in the latching units 137, they are not freely displaceable in the guiding channel 135 of the assigned slide guide 133, but are stationary or fixed but remain pivotable. When latching the pins 131 in the latching units 137, a pivoting of the lid 162 relatively to the body 160 is only allowed around a smaller pivoting angle than when guiding the pins 131 in the guiding channels 135 of the slide guides 133. In the illustrated embodiment and in the alternative mounting position according to FIG. 1C and FIG. 2A, respectively, said smaller pivoting angle is 90°. As shown, a respective one of the latching units 137 is adjoining a respectively assigned slide guide 133 at a side of an end. As also illustrated, a respective receiving opening 139 of the latching units 137 is substantially C-shaped for receiving the respectively assigned pin 131.

Figure 2:
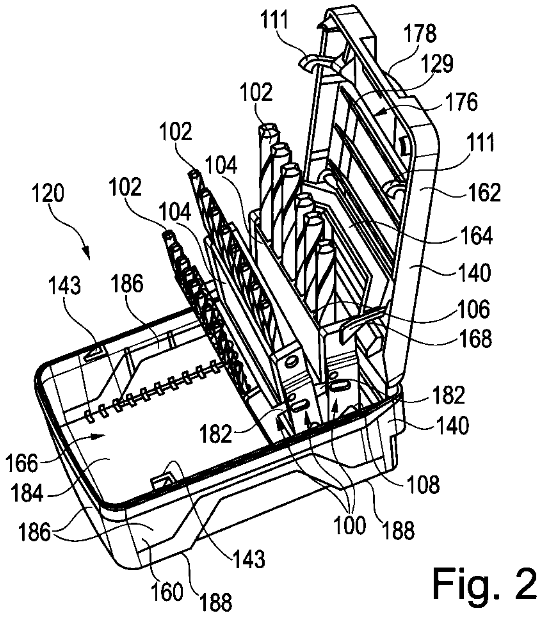

While FIG. 1 and FIG. 1A show the tool arrangement 120 with a pivoting angle between the body 160 and the lid 162 of approximately 180°, the pivoting angle between the body 160 and the lid 162 according to FIG. 2 and FIG. 1C is approximately 90°. In the mounting position according to FIG. 1, the pins 131 are located in the guiding channels 135, see FIG. 1A. In the mounting position according to FIG. 2, the pins 131 are located in the receiving openings 139 of the latching units 137, see FIG. 1C.

According to a first alternative, the hinge connection 164 may be made of such a stiff material, that the pins 131 of the hinge connection 164—unchangeably by a user—are premounted at a factory either in the slide guides 133 or in the latching units 137. For example, in this case, the operating mode according to FIG. 1 or that one of FIG. 2A is fixedly and unchangeably adjusted. Alternatively, the hinge connection 164 may be made of such a resilient or deformable or elastic material, that the pins 131 of the hinge connection 164 may be selectively guided in the slide guide 133 or may be latched in the latching units 137 in a manner which is changeable by a user, hence are re-mountable between the mentioned two mounting positions. In other words, due to the resilient material properties of the hinge connection 164, a user may freely transfer the tool arrangement 120 between the operating modes according to FIG. 1 and FIG. 2.

The pins 131 are molded to the stirrup-shaped or shield-type hinge connection 164 and are received and guided in the assigned slide guides 133 according to FIG. 1 and FIG. 1A, whereby the lid 162 is pivotable with respect to the body 160 around approximately 180°. However, alternatively, the pins 131 may also be latched in a manner adjoining an end of the slide guides 133 in the U-shaped and C-shaped latching unit 137, respectively. In this case, the lid 162 is pivotable with respect to the body 160 only around approximately 90°, compare FIG. 2 and FIG. 1C. The hinge connection 164 either may be configured so stiff that it is fixedly mounted at the factory and cannot be changed by a user anymore. Alternatively, the hinge connection 164 may be configured so softly, that a user may re-plug it between the separate positions according to FIG. 1 and FIG. 2.

FIG. 2 and FIG. 1B illustrate an actuation unit 178 of a locking mechanism 176 at the lid 162. Said locking mechanism 176 encompasses a shaft 129 which is mounted at an inner surface of the lid 162 with two latching hooks 111 which are opposing each other at the side of the end. Each latching hook 111 is shaped and positioned for rotatably engaging a respective L-shaped latching mount 143 which are opposingly attached to the body 160. Advantageously, the shaft 129 may directly abut an inner wall of the lid 162. Preferably, the shaft 129 may be embedded in an inner wall of the lid 162, namely especially advantageously adjoining mounting tabs or slants 113. The shaft 129 may be embedded in the lid 162. Descriptively, elements of the locking mechanism 176 are arranged at a position directly at a deep-drawn region of the locking mechanism 176. Screws and other small parts which are located in the tool arrangement 120 are thus prevented from interfering with or blocking operation of the shaft 129 and the latching hooks 111, respectively. Also, the lower mounting tabs or slants 113 contribute to this safety mechanism.

FIG. 5 schematically shows that the lid 162 comprises a drain 125 for water when it is acting upon a top side of the lid 162. Said drain 125 comprises channels 115, 117 at a side of an edge which are fluidically connected to each other and positioned in the region of the actuation unit 178 of the locking mechanism 176 of the lid 162. Arrows in FIG. 5 schematically show a flowing direction of rainwater or other liquid when it impinges on a top side of the tool arrangement 120. At first, the liquid flows along a path which is illustrated with the reference sign (1) toward the first channel 115. Next, the liquid flows along the first channel 115 according to reference sign (2) and subsequently along a second channel 117 at the side or the edge of the surface 127 according to reference sign (3). According to the illustrated embodiment, the channels 115, 117 are delimited by a slanted surface 127 which may be arranged in the region of the actuation unit 178.

In operation, the lid 162 may be detached from the body 160 and the hinge connection 164, compare FIG. 6 (illustration without the receiving device 100). Subsequently, the receiving device 100 may be pivoted without the lid 162 by actuating the hinge connection 164 by hand. After detaching the lid 162, the receiving devices 100 which are directly and indirectly, respectively, mounted at the body 160, may be pivoted relative to the body 160 under constricted space conditions, for example in a drawer or in a case. After detaching the lid, pivoting the receiving device 100 and removing a tool element 102 from the receiving device 100 may be performed without removing the body 160 and the receiving devices 100 which are mounted to it from the drawer or from the case.

Figure 7:
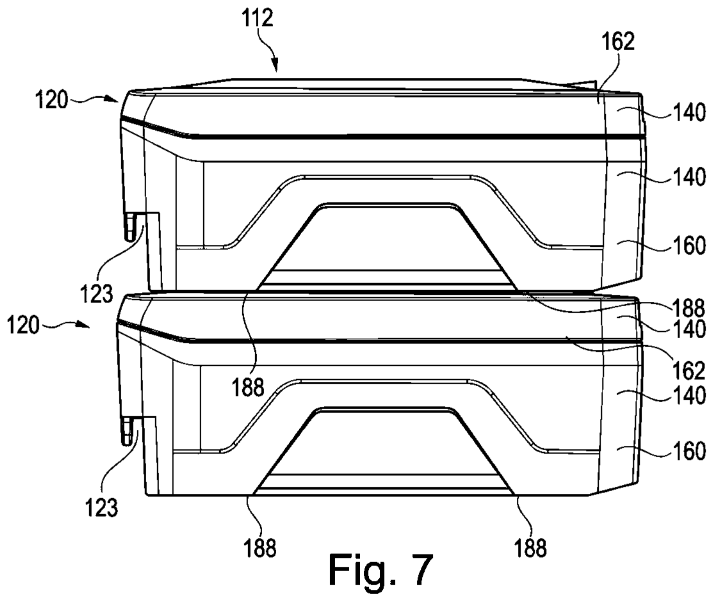
FIG. 7, FIG. 8 and FIG. 9 show three-dimensional views of a tool system made of stacked tool arrangements according to an exemplary embodiment of the invention.
Figure 8:
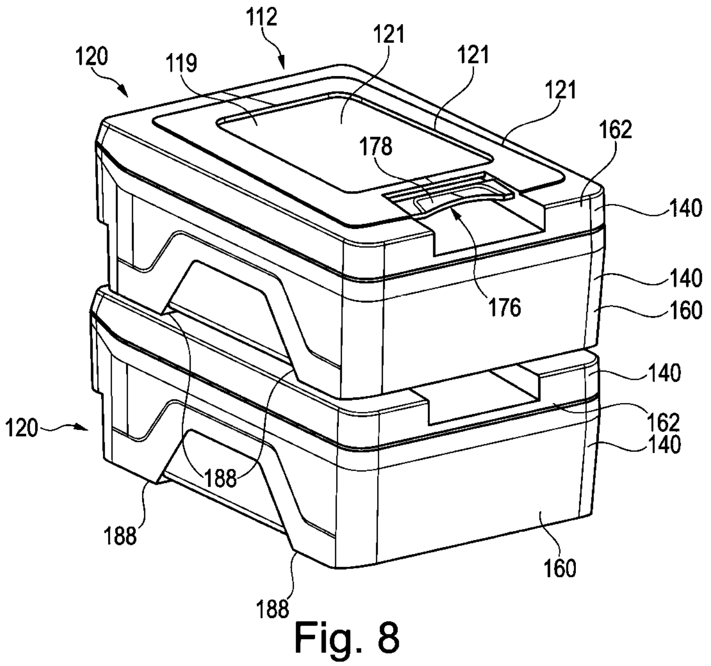
Figure 9:
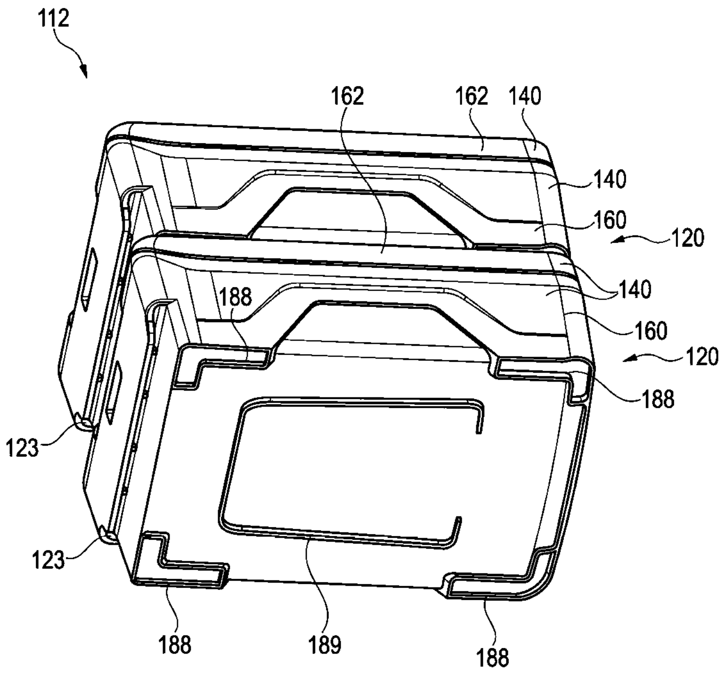

As can be taken from FIG. 7 to FIG. 9, it is advantageously possible to form-lockingly stack the tool management device 140 with a similar or identical tool management device 140. For stacking, a bottom of the body 160 may comprise feet at an outer side as appendages or structures 188 for engaging around corresponding profiles of complementary structures 121 at an upper surface of the lid 162 of a separate tool management device 140. Furthermore, it is advantageous for stacking tool management devices 140, to equip a bottom of the body 160 with a, for example an appendage (i.e., in this case an interrupted ring-bar) as a structure 189 which is configured for engaging a complementary structure 121 surrounding the indentation 119 in an inner region of the lid 162.

The tool arrangements 120 which are illustrated in FIG. 7 to FIG. 9 are thus form-lockingly stackable. By providing the bottom surface of the body 160 with a separate centrally located appendage 189 and by arranging an indentation or recessed region 119 defined by the complementary structure 121 in upper surface of the lid 162, a separate tool management device 140 or tool arrangement 120 may be form-lockingly placed thereon. This holds independently from how large or small the respective body of the other tool arrangement 120 or tool management device is. Thus, independent of their size multiple tool arrangements 120 may be stacked on top of each other, if the complementary structures 121, 188, 189 are appropriately configured with respect to each other for accomplishing this stacking.

Figure 10:
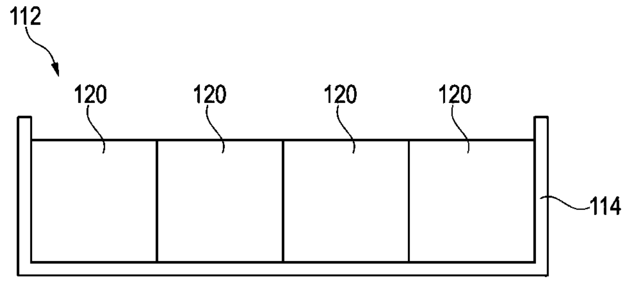
FIG. 10 shows a tool system according to an exemplary embodiment of the invention.

By arranging the actuation unit 178 of the locking mechanism 176 at a top side of the tool arrangement 120 according to FIG. 8, a lid 162 may be unlocked and locked, respectively, even when multiple tool arrangements 120 are arranged side by side in a container 114, as illustrated in FIG. 10, for example.

As can best be recognized in FIG. 7, the body 160 is provided at its outer side with a suspension unit 123 which is configured as a suspension groove, by which the tool arrangement 120 may be suspended by a rail or the like. Such a rail may thus serve as provisional or permanent attachment for the tool arrangement 120.

Furthermore, a user-definedly receiving of tool elements 102 is advantageously possible at the tool element recesses 106 which are formed at the receiving devices 100. Moreover, the receiving devices 100 may be arbitrarily replaced in the tool management device 140. In addition, equipping and/or re-equipping the receiving devices 100 by a user with a set of user-defined tool elements 102 is enabled which may be selected from a larger reservoir of tool elements 102 by a user. Also, equipping and/or re-equipping the tool management device 140 by a user with a set of user-defined receiving devices 100 may be performed. The set may be selected from a larger reservoir of receiving devices 100 by a user. The receiving devices 100 may be selected such that tool elements 102 (such as drills, bits, milling cutters, etc.) may be received by them, which a user requires for a certain mounting task. A such equipped tool arrangement 120 may be selectively utilized with the lid 162 (for example for carrying in a vehicle, protected against falling out) or without the lid 162 (for example under constricted circumstances such as in a case or in a drawer for pivoting out the receiving devices 100 without removing the tool management device 140 from the case or the drawer). Due to the detachable connections of the hinge connection 164 and the coupling structures 108, arbitrarily configuring and re-configuring the tool arrangement 120 is enabled.

For example, the body 160 with the receiving device(s) 100, in particular drill ingots and/or bit ingots, may be arranged in a case, a drawer or the like.

Furthermore, if necessary, a locking of the lid 162 with the body 160 is performed by the locking mechanism 176. The drill box comprises at the lid 162 a component of the locking mechanism 176, in order to lock the lid 162 with the body 160. Advantageously, the locking may be released with one or two fingers and at the same time the actuation unit 178 of the locking and/or the lid 162 may be grasped, such that the lid 162 may be unlocked and opened by one hand. Thus, one hand is sufficient to unlock the lid 162 and to subsequently open the lid 162.

FIG. 10 shows a tool system 112 according to an exemplary embodiment of the invention. It encompasses a container 114 (for example a case or a drawer) and a multiplicity of tool arrangements 120 which are arranged in the container 114 side by side (respectively alternatively or additionally on top of each other, not shown), as they are described with reference to FIG. 1 to FIG. 9, for example. Advantageously, the configuration according to FIG. 10 is compact and configurable by a user.

It should be noted that "comprising" does not exclude other elements or steps and the article "a" or "an" does not exclude a plurality. Furthermore, it is noted that features or steps, which are described with reference to one of the above embodiments, can also be used in combination with other features or steps of other examples described above.

The invention claimed is:

1. A tool arrangement comprising:

a tool management device with a body and a lid, wherein the lid, by a first hinge connection, is configured pivotably relative to the body, for selectively covering or releasing a receiving space of the body; and a receiving device for receiving tool elements which is mounted or mountable in the receiving space of the body such that, by a second hinge connection, the receiving device is co-pivoted when the lid is pivoted;

wherein the first hinge connection comprises two pins at opposing sides of the first hinge connection and the lid comprises two slide guides at opposing sides of the lid, each of the slide guides configured for guiding one of the two pins along a respectively pregiven trajectory;

wherein the pregiven trajectory is pregiven by a guiding channel in the respective slide guide;

wherein the guiding channel of the respective slide guide is configured to guide the respective pin from a first end to an opposing second end of the guiding channel, wherein both the first and second ends of the guiding channel are arranged in a half of the lid proximal to the first hinge;

wherein the second hinge connection laterally engages the receiving device in the receiving space and exerts a pivoting force upon the receiving device at two positions, wherein the second hinge connection is configured, by connection mechanisms at two opposing second hinge connection legs or tabs at two opposing outer sidewalls of the receiving device, to be pivotably and detachably attached to the lid.

2. The tool arrangement according to claim 1, further comprising at least one of the following features:

wherein the first hinge connection is pivotably and detachably attached to the lid by a connection mechanism including opposing tabs;

wherein the second hinge connection remains attached to the receiving device when the lid is detached from the body;

wherein the respective guiding channel of the respective slide guide is configured, by guiding the at least one pin from the first end to the opposing second end of the respective guiding channel, to allow a pivoting of the lid relatively to the body by more than 90°.

3. The tool arrangement according to claim 1, wherein a respective latching unit is formed, at which the at least one pin is latchable, alternatively to guiding in the at least one slide guide.

4. The tool arrangement according to claim 3, wherein, when the at least one pin is latched in the at least one latching unit, a pivoting of the lid relatively to the body is allowed only by a smaller pivoting angle than when guiding the at least one pin in the at least one slide guide.

5. The tool arrangement according to claim 4, wherein the smaller pivoting angle is smaller than 120°.

6. The tool arrangement according to claim 3, wherein the at least one latching unit at its end is adjoining the at least one slide guide.

7. The tool arrangement according to claim 3, wherein a receiving opening of the at least one latching unit for receiving the at least one pin is substantially C-shaped.

8. The tool arrangement according to claim 1, wherein the second hinge connection comprises a stirrup which connects the lid with the receiving device, which is configured as a substantially C-shaped stirrup.

9. The tool arrangement according to claim 1, wherein a stirrup of the second hinge connection, is configured so rigidly at a factory, that the at least one pin of the first hinge connection is pre-mounted to the slide guide or at at least one latching unit at the slide guide in a manner which is not changeable by a user.

10. The tool arrangement according to claim 3, wherein a stirrup of the second hinge connection, is configured so deformable, that the at least one pin of the first hinge connection is changeably re-mountable by a user between the slide guide and the at least one latching unit at the slide guide.

11. The tool arrangement according to claim 1, further comprising at least one of the following features:

wherein the lid comprises at least one outer receiving structure for form-lockingly inserting at least one corresponding receiving structure at a bottom side of the body of a second tool arrangement, such that the tool arrangement and the second tool arrangement are stackable;

wherein the body comprises at least one receiving structure at its bottom side for form-lockingly inserting in at least one corresponding outer receiving structure of the lid of a second tool arrangement, such that the tool arrangement and the second arrangement are stackable;

wherein the body comprises a suspension groove at its outer side for suspending in a rail.

12. The tool arrangement according to claim 1, wherein the lid comprises a drain for a liquid when presently impinging a top side of the lid;

wherein the drain comprises channels at a side of an edge which are fluidically connected to each other in a region of an actuation unit of a locking mechanism at the lid.

13. The tool arrangement according to claim 1, further comprising at least one of the following features:

wherein the lid is configured detachably from the first hinge connection;

a further hinge connection at a pivoting axis between the body and the lid, wherein the further hinge connection is configured for pivoting the lid relatively to the body, and wherein the further hinge connection is detachable from the body;

wherein the receiving device is mounted or mountable in the receiving space, such that, by the second hinge connection, the receiving device is pivoted out of the receiving space in an upright position when pivoting the lid for releasing the receiving space;

wherein the receiving device is mounted or mountable in the receiving space, such that, by the second hinge connection, the receiving device is pivoted into the receiving space in a lying position when pivoting the lid for covering the receiving space.

14. The tool arrangement according to claim 1, further comprising:

a locking mechanism attached partially at the lid and partially at the body, which is configured for locking the lid at the body, when the receiving space of the body is covered by the lid;

wherein the locking mechanism comprises an actuation unit for actuating the locking mechanism by a user at an outer surface of the lid.

15. The tool arrangement according to claim 14, wherein the locking mechanism comprises a shaft with at least one latching hook, which shaft is mounted at the lid, which latching hook is configured for rotationally engaging in at least one latching mount at the body.

16. The tool arrangement according to claim 15, further comprising at least one of the following features:

wherein the shaft directly abuts against an inner wall of the lid;

wherein the shaft is embedded in an inner wall of the lid adjoining a slant.

17. The tool arrangement according to claim 1, wherein the receiving device comprises:

a block-shaped base body;

at least one tool element recess which is formed at the base body for receiving at least one tool element; and coupling structures which are formed at the base body for coupling the receiving device with the tool management device.

18. The tool arrangement according to claim 1, comprising at least one further receiving device for receiving tool elements, which is mounted or mountable at the receiving device by angle pieces at opposing sides of the receiving device;

wherein the at least one further receiving device is mounted at a side of the receiving device which is facing away from the lid.

19. A tool system, comprising:

a container; and a plurality of tool arrangements including respective tool management devices, which are arranged in the container side by side and/or on top of each other;

wherein the tool management devices are arranged with a body and a lid, wherein the lid, by a first hinge connection, is configured pivotably relative to the body, for selectively covering or releasing a receiving space of the body; and a receiving device for receiving tool elements which is mounted or mountable in the receiving space of the body such that, by a second hinge connection, the receiving device is co-pivoted when the lid is pivoted;

wherein the first hinge connection comprises two pins at opposing sides of the hinge connection and the lid comprises two slide guides at opposing sides of the lid, each of which configured for guiding one of the pins along a respectively pregiven trajectory;

wherein the pregiven trajectory is pregiven by a guiding channel in the respective slide guide;

wherein the guiding channel of the respective slide guide is configured to guide the respective pin from a first end to an opposing second end of the guiding channel, wherein both the first and second ends of the guiding channel are arranged in a half of the lid proximal to the first hinge;

wherein the second hinge connection laterally engages the receiving device in the receiving space and exerts a pivoting force upon the receiving device at two positions, wherein the second hinge connection is configured, by connection mechanisms at two opposing hinge connection legs or tabs at two opposing outer sidewalls of the receiving device, to be pivotably and detachably attached to the lid.

20. A method of managing tool elements by a tool arrangement, the method comprising:

providing a tool management device with a body and a lid, wherein the lid, by a first hinge connection, is configured pivotably relative to the body, for selectively covering or releasing a receiving space of the body; and a receiving device for receiving tool elements which is mounted or mountable in the receiving space of the body such that, by a second hinge connection, the receiving device is co-pivoted when the lid is pivoted;

wherein the first hinge connection comprises two pins at opposing sides of the first hinge connection and the lid comprises two slide guides at opposing sides of the lid, each of which configured for guiding one of the pins along a respectively pregiven trajectory;

wherein the pregiven trajectory is pregiven by a guiding channel in the respective slide guide;

wherein the guiding channel of the respective slide guide is configured to guide the respective pin from a first end to an opposing second end of the guiding channel, wherein both the first and second ends of the guiding channel are arranged in a half of the lid proximal to the first hinge;

wherein the second hinge connection laterally engages the receiving device in the receiving space and exerts a pivoting force upon the receiving device at two positions, wherein the second hinge connection is configured, by connection mechanisms at two opposing hinge connection legs or tabs at two opposing outer sidewalls of the receiving device, to be pivotably and detachably attached to the lid; and transferring the lid between an operating state which is covering the receiving space and an operating state which is releasing the receiving space, by guiding the pins along the respective slide guides.

* * * * *